March 24, 1959 H. BLACKSTONE 2,878,711

OPTICAL SCANNER FOR DETERMINING VELOCITY-ALTITUDE

Filed July 22, 1954

INVENTOR.
HENRY BLACKSTONE
BY
Mitchell & Bechert
ATTORNEYS 2,878,711
Patented Mar. 24, 1959

2,878,711

OPTICAL SCANNER FOR DETERMINING VELOCITY ALTITUDE

Henry Blackstone, Northport, N.Y., assignor to Servo Corporation of America, New Hyde Park, N.Y., a corporation of New York Application July 22, 1954, Serial No. 444,990

15 Claims. (Cl. 88—1)

Figures 1, 2, 3:
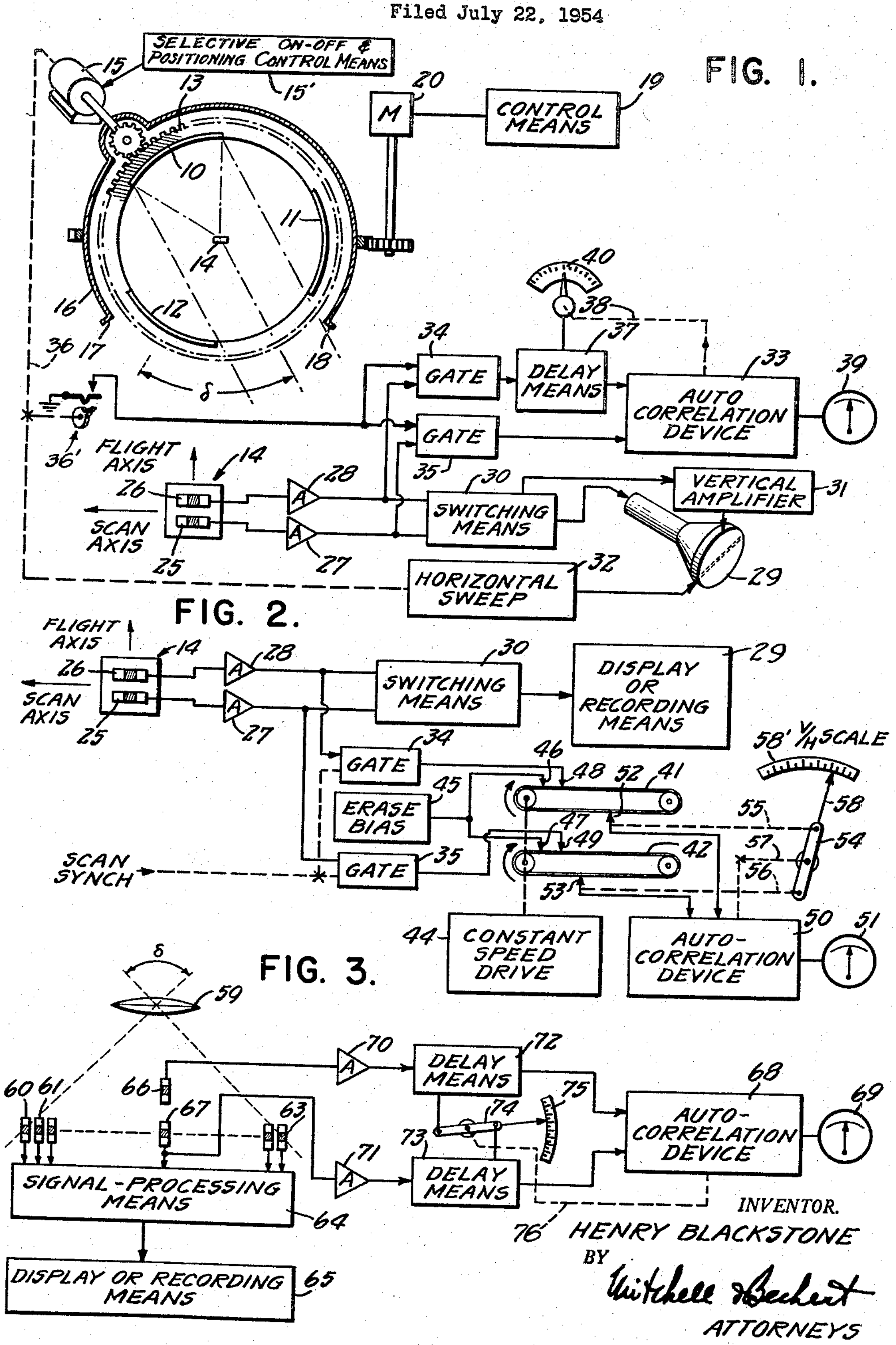

My invention relates to optical scanning devices particularly adapted to aerial reconnaissance, and this application incorporates improvements over copending patent application Serial Number 320,272, filed November 13, 1952, in the names of Henry Blackstone and Frank G. Willey.

It is an object of the invention to provide an improved device of the character indicated.

It is another object to provide, in conjunction with scanners of the character indicated, means whereby the velocity-altitude function of the aircraft can be readily ascertained.

It is a specific object to achieve the above objects with a structure requiring relatively little additional complexity over existing scanners and which may be readily adapted to existing scanners.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a view schematically indicating mechanical, optical, and electrical parts of a scanner and computer incorporating features of the invention; and Figs. 2 and 3 are views similar to Fig. 1 and illustrating modifications.

Briefly stated, my invention contemplates the application of correlating means to the separate video outputs of two energy-responsive elements spaced in the direction of the flight axis in scanners of the character indicated; the correlating means includes provision for variable delay of one of the video outputs with respect to the other until such time as correlation is achieved. Adjustment to achieve correlation may be performed manually or automatically. Since the achievement of correlation represents matching of video signals from two elements angularly spaced in the direction of the flight axis, and since this angular spacing is known, then the delay represented by the necessary adjustment is directly indicative of the angular rate of progression of the scanner past a given subject in the field of view. If such subject is on the ground beneath the aircraft, then this angular rate is the instantaneous velocity-altitude function, known for short as the V/H rate.

In application to scanners periodically sweeping laterally of the flight axis, I provide for automatically sampling the video-signal amplitude at the same part of each successive scan, thus deriving a succession of intensity points from which an envelope (as a function of time) can be interpolated; in application to so-called "push-broom" scanners having an array of elements transverse to the flight axis, the necessary video signal may be derived as a continuous function for V/H-computing purposes.

In Fig. 1 of the drawings, my invention is shown in application to a scanner of the type described in greater detail in said copending application. Such scanners may comprise a plurality of like optical elements 10—11—12 supported on a platform or drum 13 in equally spaced relation about a scanning axis. All optical elements are focused on energy-responsive means contained within an envelope or capsule 14, which may be located on the axis of rotation of the scanner drum 13. The optical systems 10—11—12 may be lenses, but in the form shown, they are mirrors of equal width and spaced by openings equal to their width. Motor means 15 continuously drives the scanner drum 13 to cause successive mirrors 10—11—12 to scan transversely of the flight axis of a carrying aircraft. A stationary (i.e. nonscanning) mask 16 may encase the described parts and provide between limits 17—18 an opening through which the successive optical elements may see for their respective scans of the full width of the field of view; the width of this field is designated $\delta$ in the drawing. Since it is desirable that the described scanner shall traverse laterally of the true flight axis, irrespective of cross-wind, I provide control means 19 for a positioning motor 20, to achieve bodily angular displacement of the scanner to the extent necessary to offset any crabbing of the aircraft on its course.

Depending upon the display desired from the output of the cell 14, the cell may comprise various configurations of independent elements. For purposes of the present invention, it is necessary that there shall be at least two elements spaced from each other in the direction of the flight axis, as shown for the case of the elements 25—26 having shaded sensitive areas. For display purposes, the outputs of elements 25—26 may be amplified by video amplifiers 27—28 and caused to intensity-modulate a display tube 29, through the action of high-speed switching means 30. The function of switching means 30 may be to coordinate the application of video outputs (27—28) to tube 29 with the correct vertical-deflection voltage, available from amplifier 31. Thus, for the elements 25—26, two vertically displaced lines (equivalent in length to the width $\delta$ of the scanned field) may be continuously presented on the face of the tube 29. If a strip record is to be continuously moving, photographic-recording techniques may be employed to follow the display traces on tube 29, all as discussed in greater detail in said copending application.

In accordance with the invention, I provide, in connection with a scanner as described, correlating means to assist in deriving the velocity-altitude function of the aircraft, from a comparison of the video outputs of the respective longitudinally spaced elements 25—26. This may be done by stopping motor 15 with one mirror (e.g. 10) facing more or less directly downward, and by continuously exposing separate inputs of an auto-correlating device 33 to the respective video signals from amplifiers 27—28; however, in the form shown, I illustrate my preference for exposing the auto-correlating means 33 only at selected portions of the scanning cycle, thus, deriving point (or sampled instantaneous-amplitude) data for correlation, rather than continuous data. For this purpose, I provide individual gating means 34—35 between amplifiers 27—28 and the device 33; both gates 34—35 may be operated in synchronism with the scanning cycle as suggested by the dashed line 36 controlling cam switch 36′ for intermittent operation once per optical scan. The auto-correlating device may include its own provision for automatically variable delay, but for a clearer description, I have separately shown delay means 37 under the control of connection 38 to the correlation device 33 for automatically delaying the gated video signal of one element with respect to the gated video signal of the other element, as dictated by the requirement for producing a null or a maximum, depending on whether device 33 responds to the difference or to the sum of signals at 27—28. Upon achievement of a null or of a maximum representing correlation, it is merely necessary to read off at 40 the delay that was required to achieve correlation, and the V/H rate of the aircraft is ascertained directly from a knowledge of this delay.

In Fig. 2, I show much the same organization of parts as described for Fig. 1 and, therefore, where applicable, the same reference characters have been applied. However, in Fig. 2, the auto-correlating means is shown specifically as of the magnetic-tape variety comprising two continuously running tapes 41—42, each stretched between spaced pulleys and driven by common drive means 44. Erasing means 45 may continuously be applied at separate heads 46—47 to "clean" the tape before a new record is applied. Separate video records are made on the tapes 41—42, by recording heads 48—49 separately supplied with gated video signals available from gates 34—35, as will be understood.

The auto-correlating device 50, including indicator 51, may respond to video signals picked up at heads 52—53 following tapes 41—42 at locations spaced from the recording locations 48—49, and by slidably displacing the pick-up heads 52—53 as needed to achieve correlation, the extraction of one video signal is variably delayed as compared with the extraction of the other. I schematically indicate at rocker arm 54 the means for effecting such adjustment; arm 54 is shown with mechanical connections 55—56 to the pick-up heads 52—53 and is so arranged that rocker-arm displacement achieves differential displacement of the heads 52—53 (i.e. differential delay adjustment for the respective video signals). It will be seen that, upon noting correlation at indicator 51, the extent of delay necessary to achieve correlation may be observed from a pointer 58 against a suitably calibrated V/H scale 58′. Again adjustment at 54 to achieve correlation may be manual or, as suggested at 57, automatic.

In Fig. 3, I illustrate application of the principles of my invention to a scanner of the so-called "push-broom" variety in which a line array of energy-responsive elements 60—61 . . . 63 is oriented transversely to the flight axis and is caused through fixed optics (schematically suggested at 59) to image the line array across the field of view on the terrain. The line array may be continuously fed to suitable signal-processing means 64, including commutating means for supply of properly integrated information to display or recording means 65. Now, in order to provide V/H features in a scanner of this type, I add a further element 66 to the array and therefore in the scan plane of the optics. This further element 66, however, is spaced transversely to the line array 60—61 . . . 63 and in the direction of the flight axis and is preferably located centrally of the array and in alignment, say, with the central element 67 of the line array. Auto-correlation means 68 may respond to the separate video outputs of elements 66—67 (as available from video amplifiers 70—71), and the delay means suggested at 72—73 may include provision for manual or automatic differential control 74, as described in connection with Fig. 2, the automatic control connection being suggested at 76. Because the elements 66—67 are continuously exposed to scanned intelligence along the flight axis, there is no need for gating these video signals, and the connection of video outputs to the auto-correlation device 68 may be continuous. Again, however, upon achieving correlation as noted on the indicator 69, the manual or automatic adjustment 74 may be read off at scale 75, which may be inscribed to provide a true indication of the V/H function.

It will be seen that I have described relatively simple means for deriving V/H data from a reconnaissance-type scanner without requiring substantial modification of the scanner. For scanners in which elements are already provided in longitudinally spaced relation as in Figs. 1 and 2, the necessary modifications are purely electronic and may, in fact, be merely plugged into existing equipments. If such scanners are gated to derive point-by-point data for correlation, there need be no interruption of the regular scanning and display (29) functions of the equipment; if, however, it becomes desirable to obtain V/H from continuous video signals, it may still be a source of relatively little inconvenience to stop the motor 15 and to position one of the optical systems, such as mirror 10, for continuous viewing in the vertical plane only for such lengths of time necessary to establish ungated correlation; when the scanner drive is stopped (as by control means 15′ of Fig. 1), gating action ceases, and if the scanner is positioned vertically (as by control means 15′ of Fig. 1), the video signals may be continuously available to the auto-correlating device 33. For "push-broom" scanners, continuous video signals may be correlated to derive V/H data without interfering with normal scanning and display functions.

While I have described the invention in detail for the preferred forms illustrated, it will be understood that modifications may be made within the scope of the invention as defined in the claims which follow.

I claim:

1. In combination, a plurality of energy-responsive elements spaced from each other along a longitudinal axis, a scanner including optical means for causing said elements to traverse said axis in a regularly recurrent scanning pattern, means for progressing said elements in the longitudinal direction, whereby said elements are caused to scan longitudinally spaced lines in a field of view for successive operations of said scanner, and correlating means including means for variably delaying the response of one of said elements with respect to that of another to achieve correlation between said one and said other responses, whereby, upon identification of the delay necessary to achieve correlation, there may be identified the angular rate at which a given object in the field of view is being longitudinally traversed by longitudinal movement of said elements as aforesaid.

2. In an airborne scanner of the character indicated, two energy-responsive elements spaced in general alignment with the flight axis, optical means for causing said elements to scan laterally of the flight axis, and correlating means responsive separately to the outputs of said elements and including means for variably delaying the output of one of said elements with respect to that of the other until correlation between said outputs is achieved, whereby, upon making the adjustment necessary to achieve correlation, the velocity-altitude function of the aircraft may be directly determined.

3. In an airborne scanner of the character indicated, two energy-responsive elements spaced in general alignment with the flight axis, optical means for causing said elements to scan laterally of the flight axis, gate means for separately gating the respective outputs of said elements, each of said gate means being operated in synchronism with the scanning movement of said scanner so as to gate the responses of said elements always at the same particular aspect of the scanning optics with respect to the field of scan, and correlating means responsive to the separate gated outputs and including variable delay means for delaying the gated video of one of said elements with respect to that of the other so that, upon achieving correlation, the velocity-altitude function of the aircraft can be ascertained from the extent of adjustment.

4. A scanner according to claim 3, in which said outputs are gated substantially at the instant of time at which the instantaneous optical axis passes through the vertical plane including the flight axis.

5. In combination, an airborne reconnaissance scanner comprising a line array of spaced energy-responsive elements extending laterally of the flight axis, a further energy-responsive element spaced transversely with respect to one element of said array, display means displaying the outputs of the elements of said line array, and correlating means rseponsive to said further element and to said one element, said correlating means including a variable delay means for delaying the video output of one of said elements with respect to the video output of the other of said elements, whereby, upon achievement of correlation between said outputs, the V/H rate of the aircraft may be ascertained from the adjustment at said delay means.

6. The combination of claim 5, in which said one and said further elements are aligned generally in the vertical plane including the flight axis.

7. An airborne scanner including energy-responsive means and scanning optical means for causing said energy-responsive means to respond to intensity of such energy along a line extending laterally of the flight axis, said energy-responsive means including first and second elements spaced from each other in a sense such that their instantaneous images cast by said optical means are spaced generally in the sense of the flight axis, correlating means responsive to the separate outputs of said first and second elements and including means for variably delaying one of said outputs with respect to the other until achievement of correlation, and means indicating the delay adjustment, whereby the aircraft V/H rate may be immediately ascertained.

8. A scanner according to claim 7, in which said correlating means includes separate delay means for each of said outputs, and means differentially varying the respective delays of said separate delay means.

9. A scanner according to claim 7, in which said correlating means is an autocorrelator including means for automatically correcting the delay adjustment to maintain correlation.

10. A scanner according to claim 7, in which said optical means is mounted for movement to cause the images of said first and second elements to scan laterally of the flight axis.

11. A scanner according to claim 7, in which said optical means is fixed and said energy-responsive means includes a line array of elements whose images cast by said optical means are spaced laterally of the flight axis, said one element being separate from said line array and said further element forming a part of said line array.

12. A scanner according to claim 7, in which said energy-responsive means and said optical means are carried as an assembly mounted for rotation with respect to the aircraft and about a generally vertical axis, and variable-positioning means for said assembly about said axis, whereby said first and second elements may be aligned in the sense of the true flight axis irrespective of drift.

13. An airborne scanner, comprising two energy-responsive elements spaced in the sense of the flight axis, an optical element focused on said energy-responsive element and mounted for rotation generally about the axis of alignment of said energy-responsive elements, whereby two lines may be simultaneously scanned laterally of the flight axis, gate means responsive to the separate video outputs of said energy-responsive elements and synchronized with rotation of said optical element to open said gate means only at the same limited angular aspect for each scan sweep of said optical element, and correlating means responsive to the gated video signals and including means for variably delaying one of said gated signals with respect to the other.

14. A scanner according to claim 13, including means for driving said optical element as aforesaid, said driving means including selective control means providing for one selected condition a continuously recycling scanning drive of said optical element and for the other selected condition a cessation of drive.

15. A scanner according to claim 14, in which said control means includes means effective for said other condition for positioning said element to the gate-open position, whereby continuous video signals from said energy-responsive elements may be correlated.

No references cited.